V. G. APPLE.
STORAGE BATTERY.
APPLICATION FILED DEC. 21, 1908.
959,192.
Patented May 24, 1910.
2 SHEETS—SHEET 1.
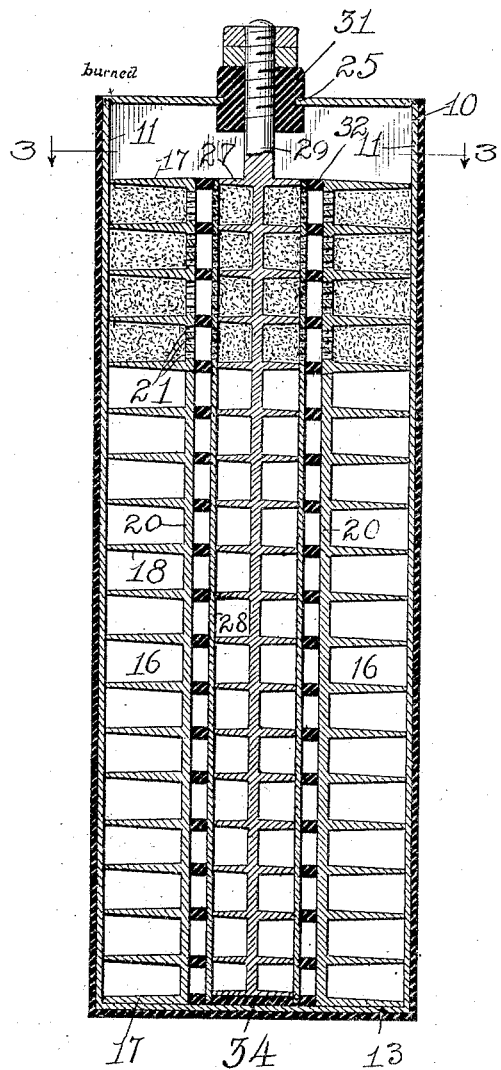
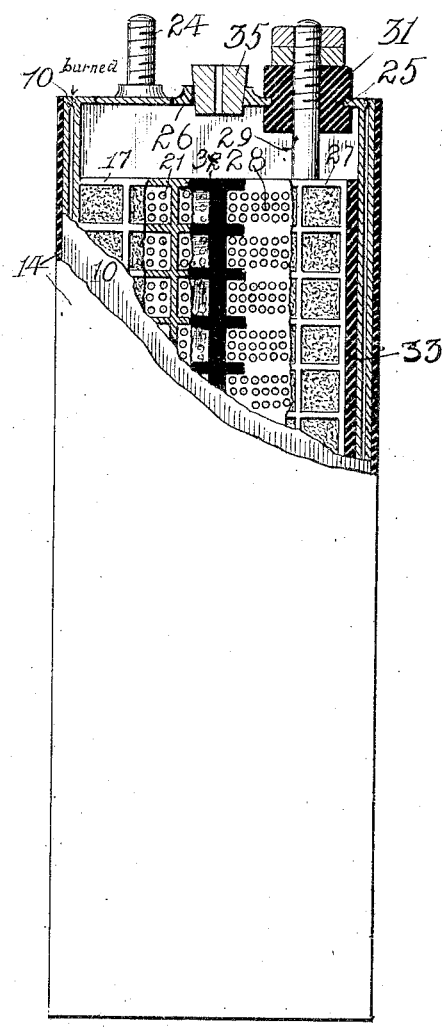
Witnesses
Inventor
Vincent G. Apple

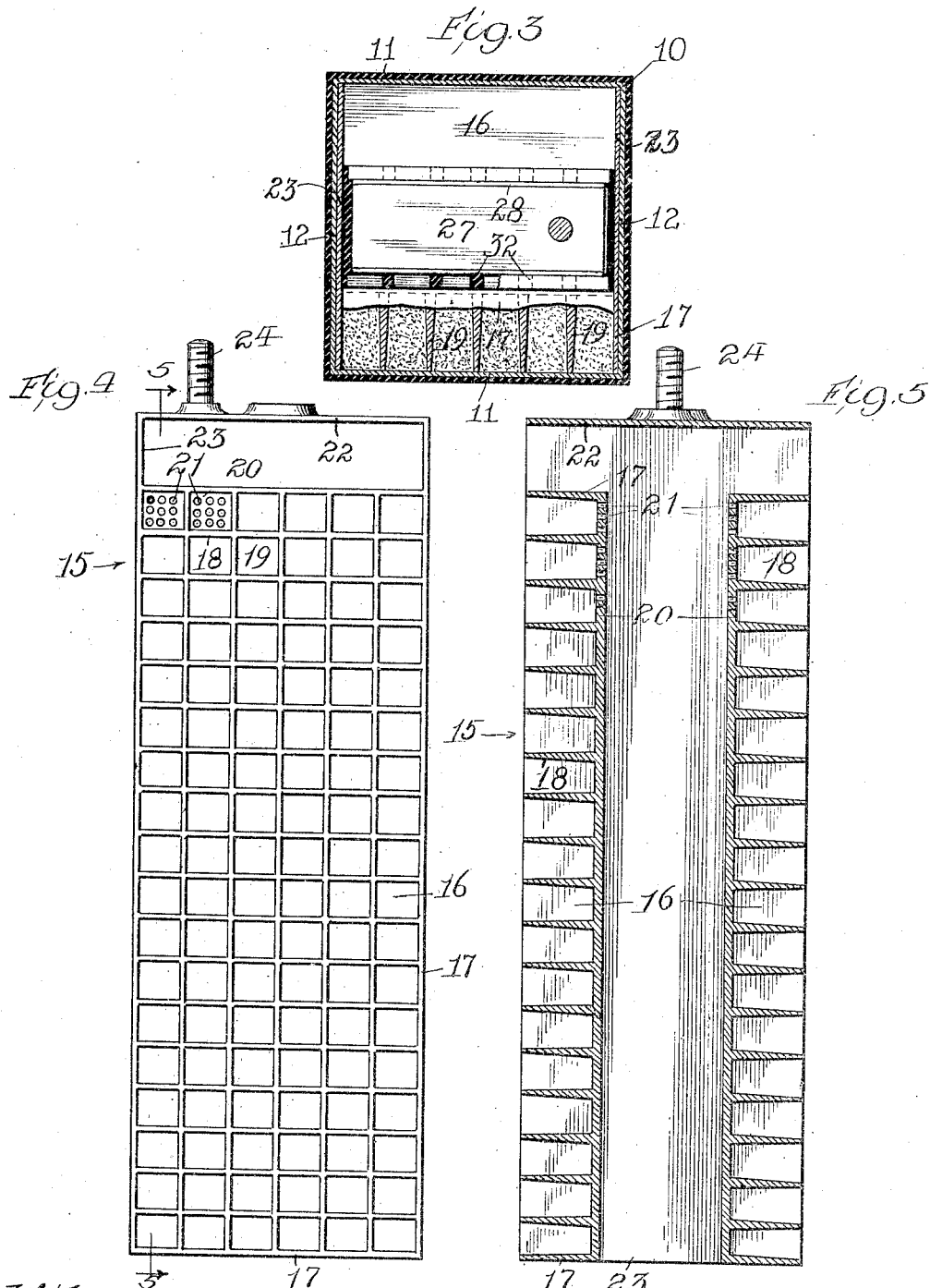

UNITED STATES PATENT OFFICE.

VINCENT G. APPLE, OF DAYTON, OHIO.

STORAGE BATTERY.

959,192.  Specification of Letters Patent.  Patented May 24, 1910.

Application filed December 21, 1908. Serial No. 468,517.

*To all whom it may concern:*

Be it known that I, VINCENT G. APPLE, a citizen of the United States, residing at Dayton, in the county of Montgomery and State of Ohio, have invented certain new and useful Improvements in Storage Batteries, of which the following is a specification.

My invention relates to improvements in storage batteries, and has for its general object to provide a storage battery of generally advantageous construction, particularly adapted for manufacture in small sizes, and at low expense.

More specifically one of the objects of my invention is to provide a construction wherein the negative end plates are integrally connected as one element although constructed independently of the containing casing.

A further object of my invention is to provide an improved construction whereby the said negative end plates may conveniently be armored, and further wherein the said plates may be connected integrally by a structure constituting the principal part of the battery closure or top plate.

Other and further objects of my invention will become apparent to those skilled in the art from the following description, taken in conjunction with the accompanying drawing, wherein I have illustrated a similar and convenient embodiment of my invention, and wherein;

Figure 1 is a vertical cross section of a storage battery; Fig. 2 is a side elevation broken away on different lines to expose the interior constructions; Fig. 3 is a horizontal cross section on line 3—3 of Fig. 1; Fig. 4 is a side elevation of the negative plate structure, and, Fig. 5 is a vertical section therethrough on line 5—5 of Fig. 4.

In the construction herein specifically shown I provide a lead cell 10, preferably of generally rectangular form in vertical and horizontal section, and preferably of relatively small size approximating the dimensions of the ordinary dry battery, although obviously the size may be varied to suit requirements. Said cell or cup preferably provides unitary side walls 11—11, end walls 12—12, and a bottom 13, smooth in plane interiorly and exteriorly. The cup thus provided may be exteriorly insulated in any convenient or desired manner, such insulating body being generally shown as at 14, and specifically constituting no part of my present invention.

The elements within the cell comprise negative end plates, that is to say, plates to which the negative terminal of the battery is connected, integrally united to constitute a single physical structure providing relatively separated plate-members affording support to the suitable active material, and spaced apart to receive between them the opposing electrical element or positive plate of suitable construction. The integral connection between the negative plates preferably includes as a part thereof, a top structure, adapted when the negative element is inserted into the cell to constitute what I will term a closure therefor, closing the top of the cell throughout, save for the vent aperture and positive terminal passage, which must be suitably provided.

In the specific construction shown 15 indicates in general the negative element, comprising two opposing grids 16—16, each having an edge frame 17, of width substantially equal to the interior width of the cell 10, and of a height preferably somewhat less than that of the cell. The frame 17 of each plate is traversed horizontally and vertically by ribs 18 and 19, dividing the plate into a number of small cells, which are preferably closed at their inner sides by an integral armor wall 20, having made therethrough suitable apertures 21. The two plates are integrally united, by having their vertical end walls expanded above the tops of the plate and are cross-connected by an integral cover plate 22, preferably of lead, of suitable size to close the top orifice of the lead jar. The end walls of the plate may also be connected throughout their vertical extent by a wall 23, so that the top and end of the negative plate member form a continuous U-shaped band, and obviously the wall 23 between the armor plates 20—20 may be cut away in whole or in part to lighten the cell or otherwise.

The top plate 22 of the negative element has connected therewith, as by casting integrally, a binding post 24, and also has made therethrough an aperture 25 for the positive binding post, and an aperture 26 for a vent plug.

It will be apparent that in manufacturing the unitary negative element may be readily constructed, as the mold part may be all withdrawn toward the exterior of the element, and the manufacture involve only a simple casting operation.

The positive plate, generally indicated at 27, may be of any suitable construction, but is preferably an armored plate having both its faces covered with perforated lead sheets and provided with an integral terminal stud 29 positioned for register with the hole 25.

In assembling the cell part the positive and negative plates are filled with active material, and the armor plates 28, if employed, are burned upon the foundation of the positive plate to completely cover the active material. The positive plate is inserted in the open bottom of the negative plate structure so that its terminal 29 projects through the aperture 25 and an insulating rubber bushing 31 is forced into the aperture 25 around the terminal 29, as shown in Figs. 1 and 2.

The insulating separators 32 of any suitable construction, herein shown as grids, are inserted between confronting faces of the positive and negative plates, and insulating strips 33 and 34 are laid along the ends and bottom of the positive plate, to effectively space it apart from the lead containing cell and the negative element. The two elements thus assembled are inserted together into the jar 10 and the top of the cell is sealed by burning the top plate 22 to the mouth of the jar 10 throughout its entire perimeter, as indicated by the word "burned" on the drawing. The electrolyte may, of course, be supplied through the aperture 26 which is then suitably reduced by a vent plug 35.

Substantially the same construction as above described may be advantageously employed without the armoring of the plates, but for certain classes of work, as for automobile ignition practice, I prefer the armored plates as tending to produce a battery adapted for slow, even discharge over a great period of time. It will also be apparent to those skilled in the art that numerous changes in the specific details of construction might be made without departure from the spirit and scope of my invention, and I do not desire to be understood as limiting my invention to the particular details illustratively employed herein, further than as specified in the claims.

Having described my invention, what I claim is:

1. In a battery, two plate-grid electrodes comprising a series of tapered ribs crossing at angles to form tapered cells for the reception of active material, said cells partially closed at their smaller ends by a perforated plate, said electrodes spaced apart with the perforated sides facing, and a containing cell the walls of which close the other ends of the tapering cells within the grids when said grid structure is placed therein.

2. In a battery, a metallic cell, two grids spaced apart and joined at their respective edges by plates to form a rectilinear structure and connected at their top edges by a perforated plate, the top edges of said plate metallically joined to the top edges of the cell, and a positive plate within the space between the two box-like negative plates with its terminal projecting through the perforation in said perforated plate.

In testimony whereof I hereunto set my hand in the presence of two witnesses.

VINCENT G. APPLE.

In the presence of—
E. V. MARTIN,
N. E. SNYDER.